April 16, 1968     F. B. DOWLING ETAL     3,377,868

SAMPLER-DISPENSER FOR FLUIDS

Filed Jan. 15, 1965

United States Patent Office 3,377,868
Patented Apr. 16, 1968

3,377,868
SAMPLER-DISPENSER FOR FLUIDS
Fred B. Dowling, 377 N. Waverland Drive 70815;
Arthur R. Choppin, 722 S. Lakeview Drive 70810;
and George R. Lyles, 454 Highland Park Drive
70808, all of Baton Rouge, La.
Filed Jan. 15, 1965, Ser. No. 425,741
3 Claims. (Cl. 73—425.4)

ABSTRACT OF THE DISCLOSURE

A device for obtaining true composite samples of liquids and/or dispensing fluids at a chosen constant rate. A water tight, gas tight container is provided with a liquid transport tube and gas transport tube which are sealed hermetically within the chamber and extend outside thereof. The outside end of the gas transport tube terminates in a restricting means for preferentially passing gas.

This invention relates in general to devices for handling fluent materials and more particularly to samplers and dispensers for fluids.

Modern technology has often required that an accurate sample of a particular fluid be supplied for analysis. Moreover, when the particular fluid to be sampled is a stream, river, reservoir, or the like, the composition of which may vary from instant to instant, it is often necessary to secure a true composite sample, i.e., one which has been continuously extracted from the body of fluid in question at a substantially constant rate over a given period of time. Additionally, it is often required for analytical and other purposes that a particular fluid sample be dispensed continuously at a chosen rate, which should remain essentially constant.

Accordingly, it is an object of this invention to provide a device for obtaining accurate samples of fluids.

Another object of the invention is to provide a device for obtaining true composite samples of fluids.

Another object of the invention is to provide a device for obtaining true composite samples of liquids, obtained at a substantially constant rate which is independent of atmospheric pressure, time or depth taken.

Another object of the invention is to provide a device for obtaining true composite samples of liquids, which samples are not diluted or altered in any way after the device has been shut off.

Another object of the invention is to provide a device for obtaining true composite samples of liquids, which device can be calibrated for automatic shut-off at any sample volume or elapsed time.

Another object of the invention is to provide a device for obtaining true composite samples of liquids, which device contains no moving parts.

Another object of the invention is to provide a device for obtaining true composite samples of liquids, which device is capable of functioning in spite of momentary changes in its attitude or orientation in the liquid in question.

Another object of the invention is to provide a device for obtaining true composite samples of liquids, which device is not required to be connected to anything at or above the surface of the liquid to be sampled, and which requires no external power for sampling in remote or hazardous places.

Another object of the invention is to provide a device for obtaining true composite samples of liquids having a high solids content, which device is not subject to plugging.

Yet another object of the invention is to provide a device for dispensing fluids continuously at a chosen rate which is substantially constant.

These benefits, as well as other objects and features, and a fuller understanding of the invention will become more apparent from the following specifications and claims, taken in conjunction with the accompanying drawing, wherein:

Figure 1:
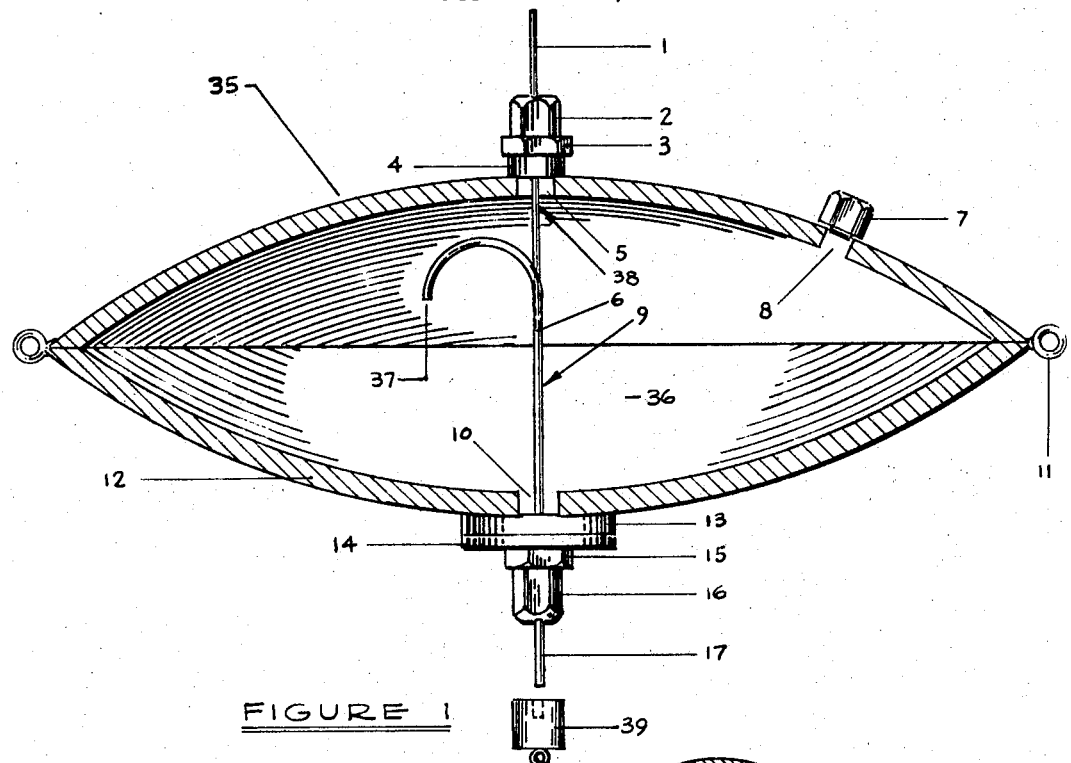
FIGURE 1 is a schematic sectional view of an apparatus in accordance with the invention.

With reference to the drawing, FIGURE 1 is a schematic sectional view of a device in accordance with the invention, generally designated by the reference numeral 35. The device 35 comprises in cooperative combination a fluid containing means or casing 12, the walls of which define a water-tight, gas-tight chamber 36. Hermetically secured within an aperture 10 of the casing is a liquid transport tube 9 which extends both into the casing and outside thereof. The upper end 37 of the liquid transport tube is confined within the chamber and is bent through an angle greater than a right angle with respect to the lengthwise direction of the liquid transport tube. The liquid transport tube is secured by means of fitting housing 15 and cap 16. Hermetically secured within an aperture 5 of the casing is a gas transport tube 38. If desired, the liquid transport tube 9 and the gas transport tube 38 may be hermetically secured with the same aperture in the casing. The arrangement shown in the drawing, however, is preferred. The upper end of the gas transport tube is positioned outside the chamber proper and within the aperture 5 and orifice housing member 3 and contains a restricting device providing a limiting orifice. The lower end 6 of the gas transport tube is preferably positioned at a point below the upper end 37 of the liquid transport tube. Connected to the upper end of the gas transport tube and cooperating with the limiting orifice is a hollow, tubular expansion chamber 1, which provides for expansion of gas emanating from the limiting orifice, thereby allowing it to escape freely when the device is submerged in a liquid. The tubular expansion chamber 1 is secured by fitting cap 2 to the orifice housing 3, which is secured to the casing 12 by collar 4. An aperture 8 in the casing serves as a drain port to remove liquid samples and allow for pressurization in the chamber. The plug 7 hermetically seals the chamber from its surroundings. Hooks 11 are secured on the casing and provide for anchoring of the device or attaching it to objects above or below the surface of liquids, when the device is employed for the sampling of the same. Weights 13 and 14 serve as ballast and aid in balancing the device and maintaining its normal attitude when it is submerged in a fluid. Plug 39 seals the liquid transport tube during pressurization.

The casing 12 may be constructed from any material inert to the fluid being sampled or dispensed. In addition, the material should be capable of withstanding pressures greater than atmospheric. For this purpose metals are preferred when they are otherwise acceptable. The shape of the container is designed to be compatible with the dynamic properties of the fluid being sampled, or it may be merely a matter of convenience when the device is utilized for dispensing purposes. When a reservoir is being sampled, for example, the dual saucer design of FIGURE 1 is preferred, as this shape affords a degree of stability and resistance to changes in normal attitude.

The radius of curvature of the bent portion of the upper end 37 of the liquid transport tube should preferably be compatible with the diameter of such tube, in order that unnecessary and unwanted constrictions are avoided. No filter screen is necessary at the lower end 17 of the liquid transport tube, if its diameter is large enough to permit passage of suspended solids or other such materials in a liquid being sampled.

Figures 2, 3:
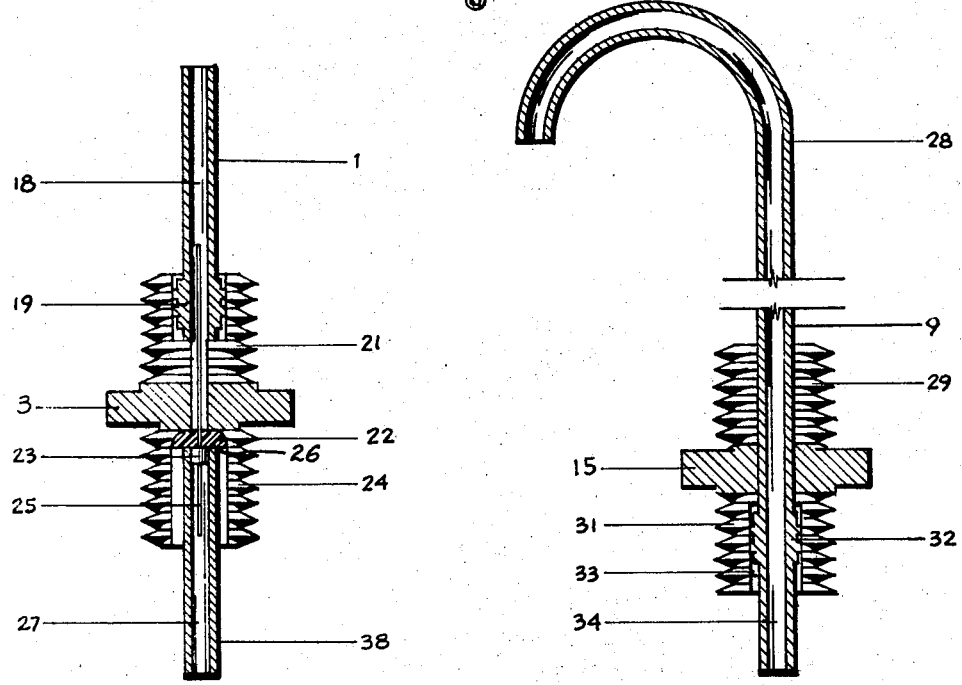
FIGURE 2 is a fragmentary cross sectional view of a portion of the apparatus of FIGURE 1.
FIGURE 3 is a fragmentary cross sectional view of another portion of the apparatus of FIGURE 1.

In FIGURE 2, a detailed cross sectional view of the gas transport tube—limiting orifice—expansion chamber assembly is presented. The expansion chamber 1 is crimped to the tube ferrule 19. The needle 23 defining the limiting orifice is inserted in the orifice housing 3 through the hermetic seal 22, the lower end 25 of the needle extending into interior 27 of the gas transport tube for preferentially passing gas. The upper end of the needle extends into the interior 18 of the expansion chamber. The upper end exterior 26 of the gas transport tube is sealed to the orifice housing 3. The orifice housing 3 is threaded with tubing threads 21 on the expansion chamber side and with pipe threads 24 on the gas transport tube side.

In FIGURE 3, a detailed cross sectional view of the liquid transport tube assembly is shown. The liquid transport tube 9 is positioned in fitting housing 15 so that the bent portion 28 of the liquid transport tube is positioned inside the chamber. The liquid transport tube is secured in position by packing gland 32. The opening 33 in the fitting housing permits adjustment of the liquid transport tube when the liquid transport tube is not locked. The interior 34 of the liquid transport tube is of sufficient size to allow for the passage of solid material normally expected in certain liquid media to be sampled. The fitting housing is secured to the casing by pipe threads 29, and the fitting cap is fastened by tube threads 31 to secure the liquid transport tube.

In the operation of the device as a sampler of liquids in accordance with the present invention, the following steps are followed:

(a) Raise the upper end 37 of the liquid transport tube within the chamber to a height commensurate with the volume of sample desired.

(b) Choose a needle 23 defining the desired limiting orifice.

(c) Position the lower end 6 of the gas transport tube below the upper end 37 of the liquid transport tube.

(d) Insert plug 39 in the lower end 17 of the liquid transport tube, and charge the chamber through 7 with a suitable inert gas to a pressure greater than that at the depth at which the sampler will operate.

(e) Lower the device into the liquid to the desired depth and remove plug 39 with a lanyard.

(f) Anchor or fasten the device to objects above or below the liquid surface by means of cables attached to the hooks 11.

Excess gas is discharged from the chamber through both the liquid transport tube and the gas transport tube until an equilibrium is established between the external and internal pressures, whereupon liquid is drawn at a substantially constant rate into the liquid transport tube 9 and is deposited in the chamber 36. The rate of sample intake is determined by the rate of discharge of gas from the chamber, which in turn varies with the size of the limiting orifice and the perpendicular distance between the limiting orifice and the upper end of the liquid transport tube. When liquid fills the chamber to the level of the lower end of the gas transport tube, gas can no longer escape from the chamber, and any further substantial intake of the liquid is thereby prevented. The position of the lower end of the gas transport tube therefore determines the volume of sample taken. When the intake of sample has ceased, the bent portion of the liquid transport tube is drained, thereby forming a gas lock, which prevents any diffusion, dilution, or modification in the body of the sample in the chamber.

The expansion chamber allows gas emanating from the limiting orifice to form bubbles, the buoyant force of which is greater than the surface tension of the surrounding liquid.

Fluid samples, for example those collected by the above procedure, may be dispensed at a substantially constant rate; the only apparatus modification required is that the upper end of the liquid transport tube is bent through 180° and positioned at that level which affords drainage of the desired volume of liquid from the sampler.

Although we have described our invention with a degree of particularity, it is understood that the present disclosure has been made only by way of example, and that numerous alterations, modifications, and changes in the details of construction may be resorted to without departing from the spirit and scope of the present invention as it is set forth and defined in the hereto appended claims.

What is claimed is:

1. A device for the sampling and dispensing of fluids, which comprises:
    (a) a casing having walls defining a water-tight, gas-tight chamber;
    (b) a liquid transport tube secured hermetically within an aperture in said casing and extending both into said chamber and outside thereof, the upper end of said liquid transport tube confined within said chamber; and
    (c) a gas transport tube secured hermetically within an aperture in said casing and extending both into said chamber and outside thereof, said gas transport tube having an upper end positioned without the confines of said chamber and a lower end within the confines of said chamber, said upper end of said gas transport tube terminating in a restricting means providing a limiting orifice for preferentially passing gas.

2. A device as recited in claim 1, including as an additional element means cooperating with said limiting orifice providing for expansion of gas emanating from said limiting orifice.

3. A device for the sampling and dispensing of fluids, which comprises:
    (a) A casing having walls defining a water-tight; gas-tight chamber;
    (b) A liquid transport tube secured hermetically within an aperture in said casing and extending both into said chamber and outside thereof, the upper end of said liquid transport tube confined within said chamber and bent through an angle greater than a right angle with respect to the lengthwise direction of said liquid transport tube;
    (c) A gas transport tube secured hermetically within an aperture in said casing and extending both into said chamber and outside thereof, said gas transport tube having an upper end positioned without the confines of said chamber and a lower end within the confines of said chamber, said upper end of said gas transport tube terminating in a limiting orifice, and said lower end of said gas transport tube being positioned below said upper end of said liquid transport tube; and
    (d) An expansion chamber cooperating with said limiting orifice providing for expansion of gas emanating from said limiting orifice.

References Cited
UNITED STATES PATENTS

| | | | |
|---|---|---|---|
| 2,300,194 | 10/1942 | Anderson | 73—425.4 |
| 2,533,726 | 12/1950 | Floyd | 73—425.6 X |
| 2,650,499 | 9/1953 | Quist | 73—425.4 |
| 2,737,812 | 3/1956 | Haak | 73—425.4 |

DAVID SCHONBERG, *Primary Examiner.*

LOUIS R. PRINCE, *Examiner.*

DANIEL M. YASICH, *Assistant Examiner.*